US012795493B2

(12) United States Patent
Jung et al.

(10) Patent No.: US 12,795,493 B2
(45) Date of Patent: Nov. 10, 2026

(54) MOBILITY ENHANCEMENT IN WIRELESS COMMUNICATION SYSTEM

(71) Applicant: LG Electronics Inc., Seoul (KR)

(72) Inventors: Sunghoon Jung, Seoul (KR); Jiwon Kang, Seoul (KR); Hongsuk Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 354 days.

(21) Appl. No.: 18/569,938

(22) PCT Filed: Jul. 20, 2022

(86) PCT No.: PCT/KR2022/010587

§ 371 (c)(1),
(2) Date: Dec. 13, 2023

(87) PCT Pub. No.: WO2023/003337

PCT Pub. Date: Jan. 26, 2023

(65) Prior Publication Data

US 2024/0276338 A1 Aug. 15, 2024

(30) Foreign Application Priority Data

Jul. 20, 2021 (KR) ........................ 10-2021-0094957

(51) Int. Cl.
*H04W 36/30* (2009.01)
*H04W 36/00* (2009.01)

(52) U.S. Cl.
CPC ..... *H04W 36/305* (2018.08); *H04W 36/0085* (2018.08); *H04W 36/0069* (2018.08)

(58) Field of Classification Search
None
See application file for complete search history.

(56) References Cited

U.S. PATENT DOCUMENTS

| | | | | |
|---|---|---|---|---|
| 9,344,909 | B2 * | 5/2016 | Seo | H04L 1/20 |
| 10,333,683 | B2 * | 6/2019 | Palenius | H04W 48/16 |
| 2019/0052377 | A1 * | 2/2019 | Hwang | H04B 17/309 |
| 2019/0200249 | A1 * | 6/2019 | Yoon | H04W 24/08 |
| 2019/0313314 | A1 | 10/2019 | Yang | |

(Continued)

FOREIGN PATENT DOCUMENTS

| | | | | |
|---|---|---|---|---|
| WO | WO-2018143776 A1 * | 8/2018 | | H04W 72/23 |
| WO | WO 2021/040890 A1 | 3/2021 | | |
| WO | WO 2021/112747 | 6/2021 | | |

OTHER PUBLICATIONS

Asia Pacific Telecom, FGI, "Discussion of enhancements on HST-SFN deployment," 3GPP TSG RAN WG1 #104b-e, R1-2102728, e-Meeting, Apr. 12-20, 2021, 4 pages.

(Continued)

*Primary Examiner* — Adolf Dsouza
(74) *Attorney, Agent, or Firm* — Fish & Richardson P.C.

(57) ABSTRACT

A method and apparatus for a mobility enhancement-based mobility in wireless communications. A user equipment (UE) may perform a mobility based on consolidated radio link states of one or more transmit/receive points (TRPs). Specifically, the UE may determine a radio link state of one or more first TRPs, select a TRP among multiple TRPs based on the radio link state of the one or more first TRPs, and activate a configuration related to the selected TRP.

12 Claims, 14 Drawing Sheets

(56) References Cited

U.S. PATENT DOCUMENTS

| | | | | |
|---|---|---|---|---|
| 2020/0305038 | A1* | 9/2020 | Tooher .................. | H04W 24/10 |
| 2020/0350972 | A1 | 11/2020 | Yi et al. | |
| 2021/0058997 | A1 | 2/2021 | Zhang et al. | |
| 2021/0329515 | A1* | 10/2021 | Sharma ................. | H04W 80/02 |

OTHER PUBLICATIONS

International Search Report and Written Opinion in Appln. No. PCT/KR2022/010587, mailed on Oct. 25, 2022, 3 pages.

Extended European Search Report in European Appln. No. 22846207.3, mailed on Nov. 8, 2024, 9 pages.

* cited by examiner

MOBILITY ENHANCEMENT IN WIRELESS COMMUNICATION SYSTEM

CROSS-REFERENCE TO RELATED APPLICATIONS

This application is a National Stage application under 35 U.S.C. § 371 of International Application No. PCT/KR2022/010587, filed on Jul. 20, 2022, which claims the benefit of Korean Patent Application No. 10-2021-0094957, filed on Jul. 20, 2021. The disclosures of the prior applications are incorporated by reference in their entirety.

TECHNICAL FIELD

The present disclosure related to a mobility enhancement based mobility in wireless communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems, 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In wireless communications, UE may perform a mobility to a mobility target. The mobility may comprise activating/applying a new configuration for the mobility target, and deactivating/releasing the current configuration for a mobility source. The mobility may be performed if/when one or more TRPs are configured.

SUMMARY

An aspect of the present disclosure is to provide method and apparatus for a mobility enhancement in a wireless communication system.

Another aspect of the present disclosure is to provide method and apparatus for a mobility if/when one or more TRPs are configured in a wireless communication system.

According to an embodiment of the present disclosure, a method performed by a user equipment (UE) in a wireless communication system comprises: receiving configurations for multiple transmit/receive points (TRPs) including one or more first TRPs associated with a first cell; determining a radio link state of the one or more first TRPs based on a configuration for the one or more first TRPs; selecting a TRP among the multiple TRPs based on the radio link state of the one or more first TRPs; and activating a configuration for the selected TRP.

According to an embodiment of the present disclosure, a user equipment (UE) configured to operate in a wireless communication system comprises: at least one transceiver; at least processor; and at least one computer memory operably connectable to the at least one processor and storing instructions that, based on being executed by the at least one processor, perform operations comprising: receiving configurations for multiple transmit/receive points (TRPs) including one or more first TRPs associated with a first cell; determining a radio link state of the one or more first TRPs based on a configuration for the one or more first TRPs; selecting a TRP among the multiple TRPs based on the radio link state of the one or more first TRPs; and activating a configuration for the selected TRP.

According to an embodiment of the present disclosure, at least one computer readable medium (CRM) stores instructions that, based on being executed by at least one processor, perform operations comprising: receiving configurations for multiple transmit/receive points (TRPs) including one or more first TRPs associated with a first cell; determining a radio link state of the one or more first TRPs based on a configuration for the one or more first TRPs; selecting a TRP among the multiple TRPs based on the radio link state of the one or more first TRPs; and activating a configuration for the selected TRP.

According to an embodiment of the present disclosure, an apparatus for configured to operate in a wireless communication system comprises: at least processor; and at least one computer memory operably connectable to the at least one processor, wherein the at least one processor is configured to perform operations comprising: receiving configurations for multiple transmit/receive points (TRPs) including one or more first TRPs associated with a first cell; determining a radio link state of the one or more first TRPs based on a configuration for the one or more first TRPs; selecting a TRP among the multiple TRPs based on the radio link state of the one or more first TRPs; and activating a configuration for the selected TRP.

According to an embodiment of the present disclosure, a method performed by a network node configured to operate in a wireless communication system comprises: transmitting, to a user equipment (UE), configurations for multiple transmit/receive points (TRPs) including one or more first TRPs associated with a first cell, wherein the one or more first TRPs include at least one active TRP: transmitting, to the UE, data via the at least one active TRP; and controlling a transmission of data to the UE via a TRP after a configuration for the TRP is activated, wherein the TRP is selected among the multiple TRPs based on a radio link state of the one or more first TRPs, and wherein the radio link state of the one or more first TRPs is determined based on a configuration for the one or more first TRPs.

According to an embodiment of the present disclosure, a network node configured to operate in a wireless communication system comprises: at least one transceiver; at least processor; and at least one computer memory operably connectable to the at least one processor and storing instructions that, based on being executed by the at least one processor, perform operations comprising: transmitting, to a user equipment (UE), configurations for multiple transmit/receive points (TRPs) including one or more first TRPs associated with a first cell, wherein the one or more first TRPs include at least one active TRP; transmitting, to the UE, data via the at least one active TRP; and controlling a transmission of data to the UE via a TRP after a configuration for the TRP is activated, wherein the TRP is selected among the multiple TRPs based on a radio link state of the one or more first TRPs, and wherein the radio link state of the one or more first TRPs is determined based on a configuration for the one or more first TRPs.

The present disclosure can have various advantageous effects.

For example, UE can perform a mobility to a non-serving cell or a TRP associated with a serving cell based on a consolidation of radio link states of one or more TRPs associated with the serving cell. Therefore, link stability can be enhanced, and service continuity can be guaranteed.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
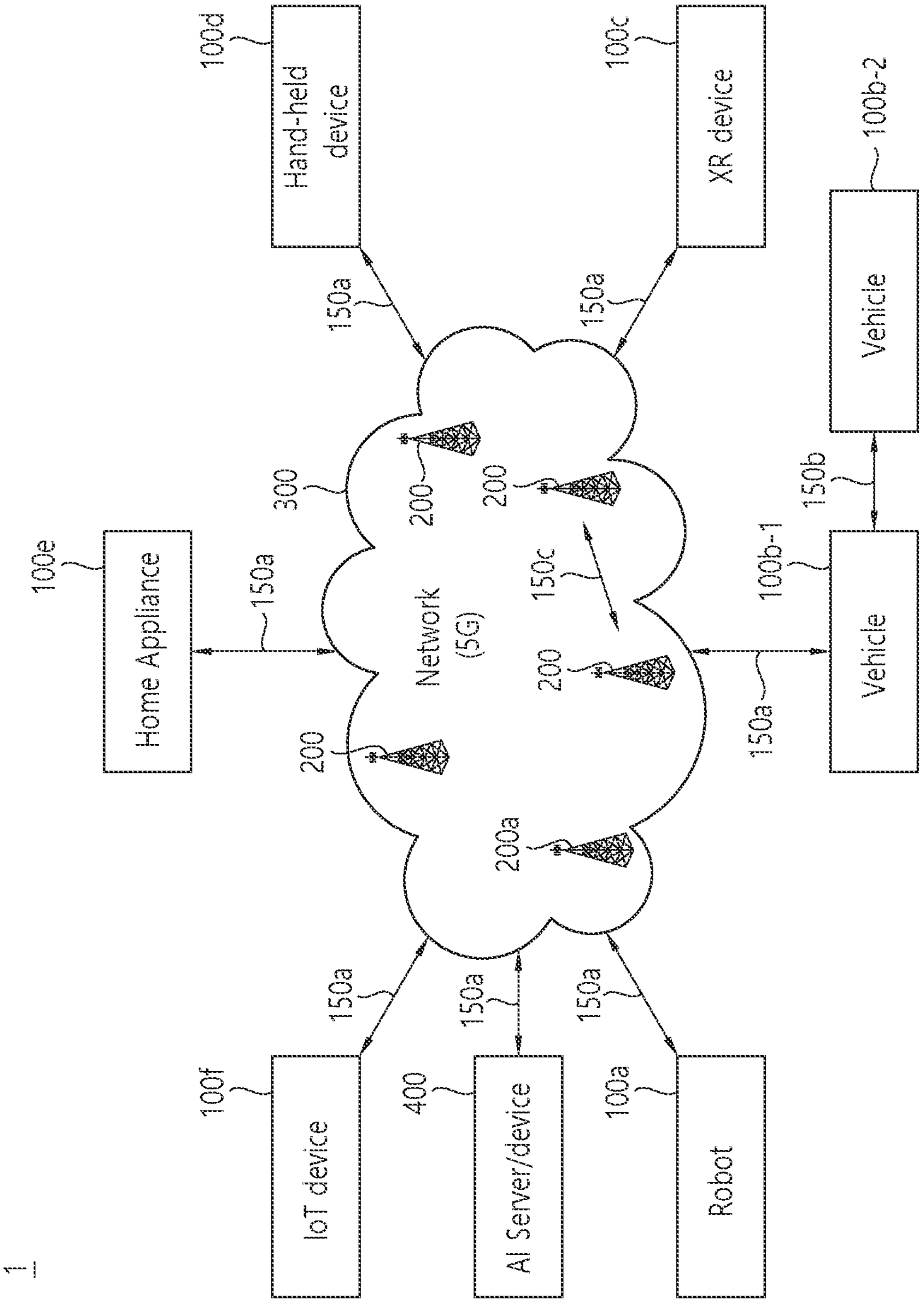
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, the terms 'cell quality'. 'signal strength', 'signal quality', 'channel state', 'channel quality'. 'channel state/reference signal received power (RSRP)' and 'reference signal received quality (RSRQ)' may be used interchangeably.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100*a* to 100*f* represent devices performing communication using radio access technology (RAT) (e.g., 5G new RAT (NR)) or LTE) and may be referred to as communication/radio/5G devices. The wireless devices 100*a* to 100*f* may include, without being limited to, a robot 100*a*, vehicles 100*b-l* and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (IAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Figure 2:
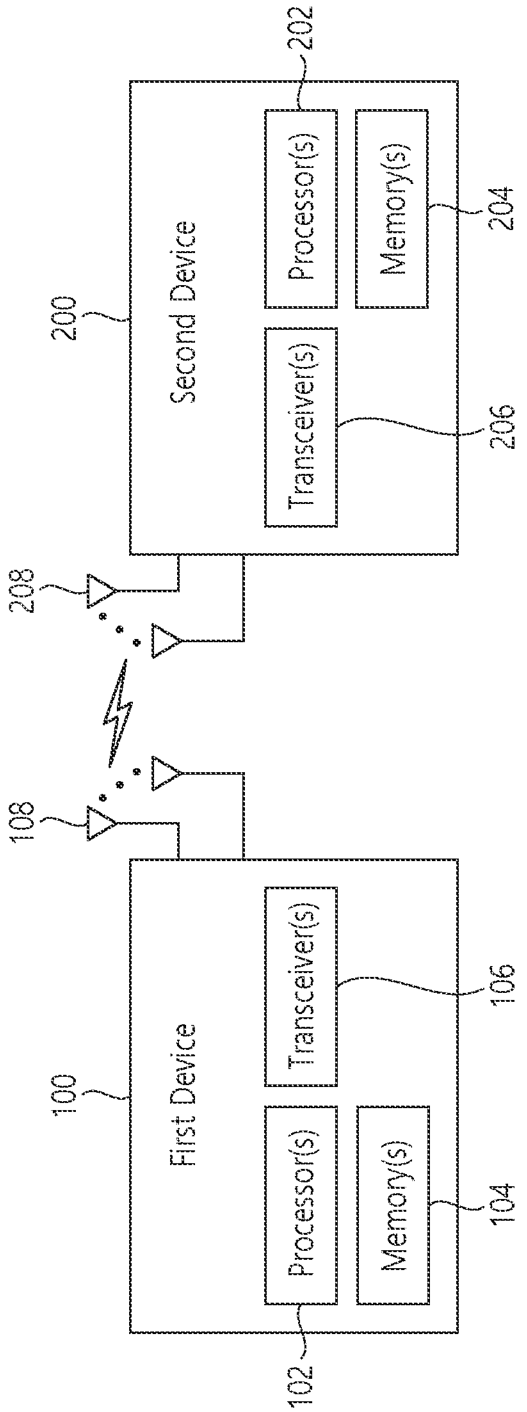
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100*a* to 100*f* and the BS 200}, {the wireless device 100*a* to 100*f* and the wireless device 100*a* to 100*f*} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP)layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202, descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
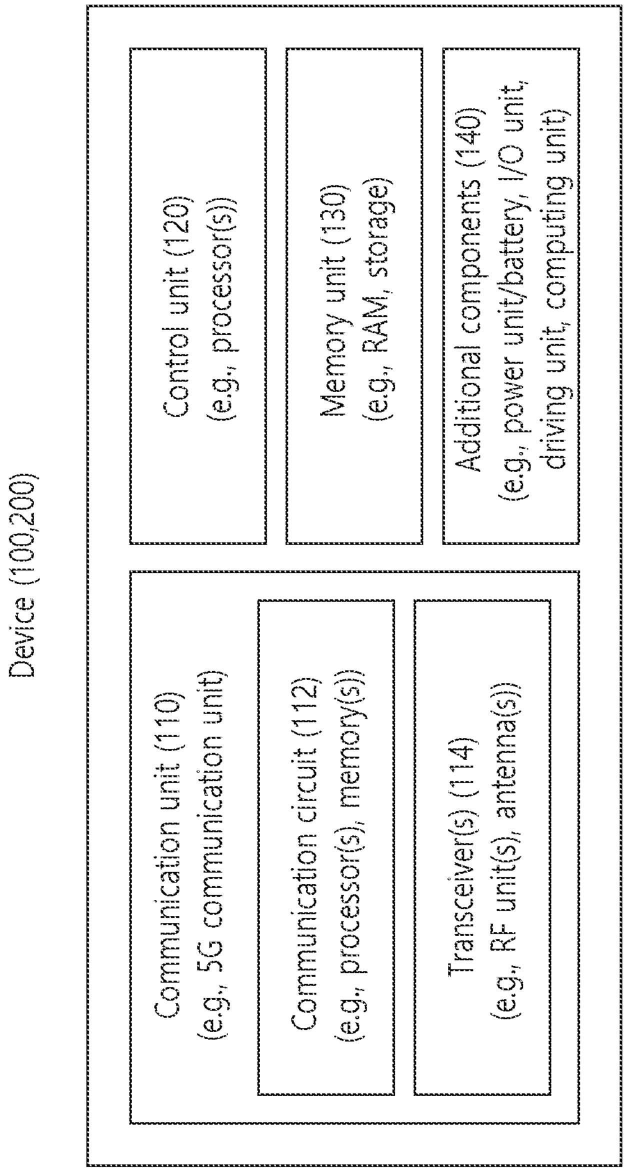
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
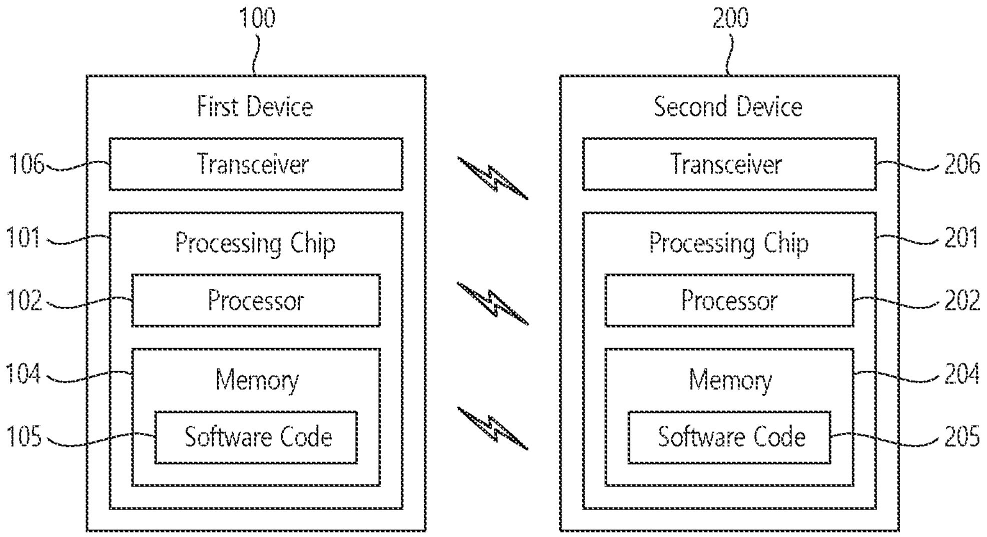
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure.

For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
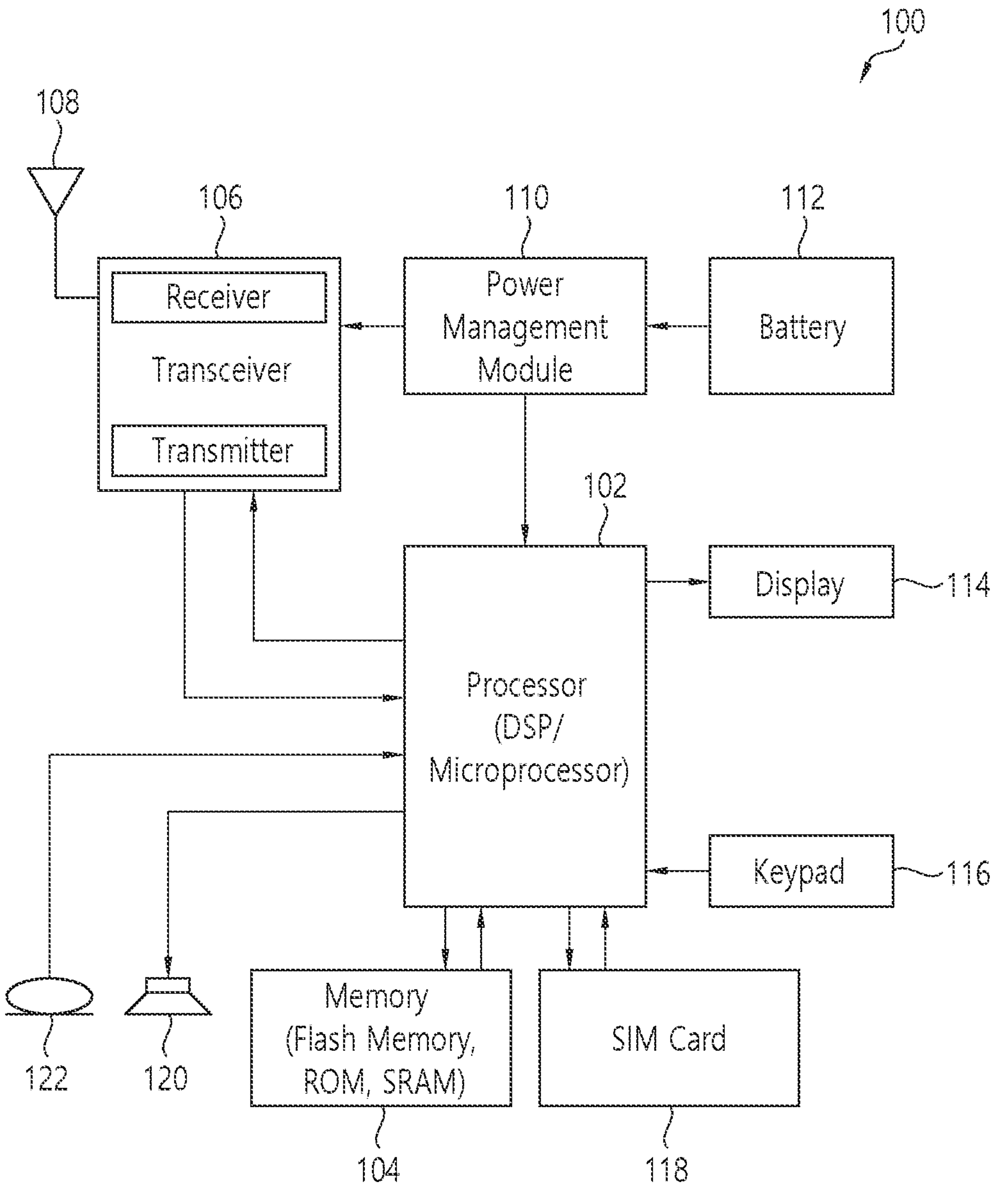
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®. EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
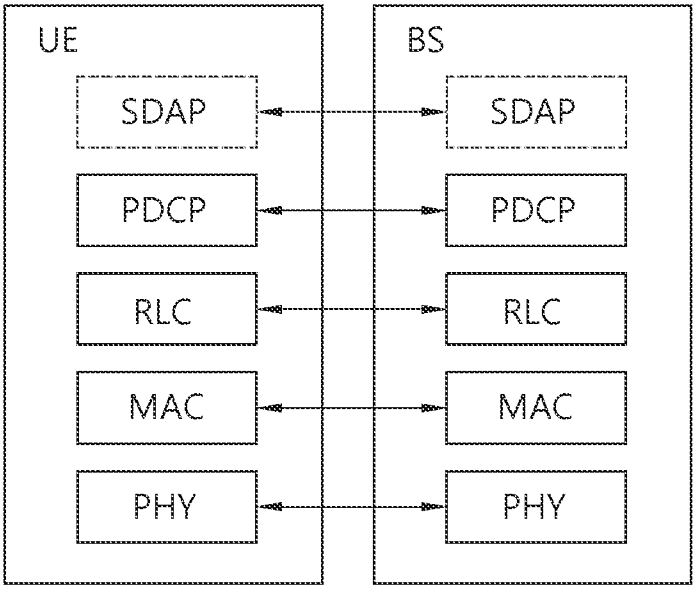
FIGS. 6 and 7 show an example of protocol stacks in a 3GPP based wireless communication system to which implementations of the present disclosure is applied.
Figure 7:
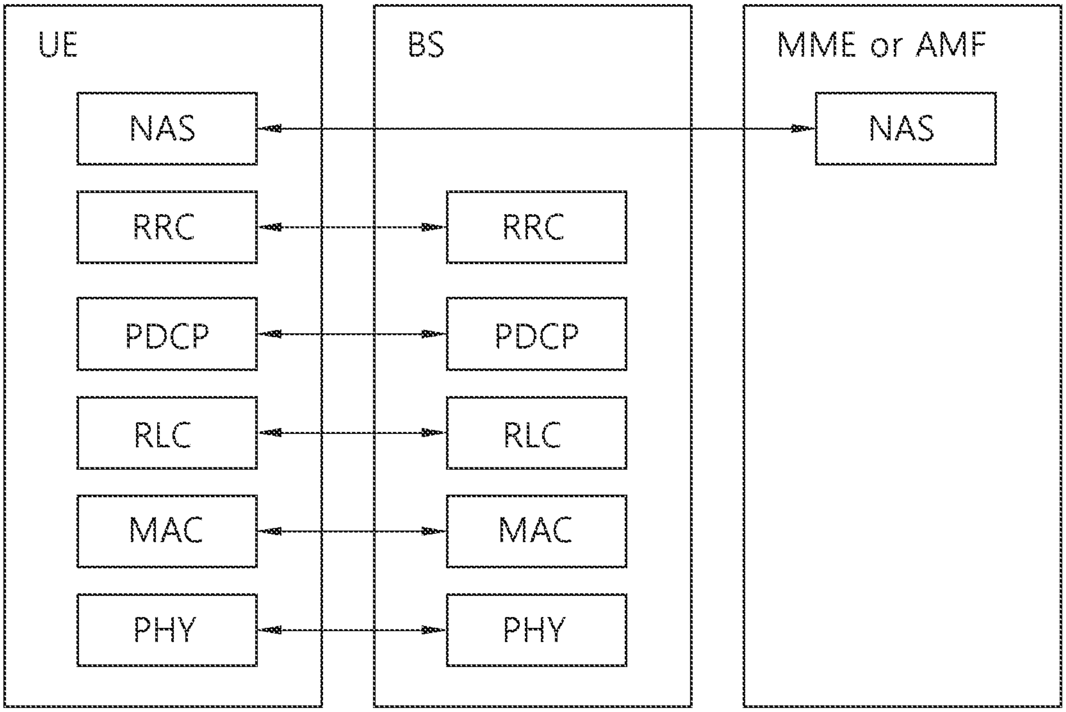

FIGS. 6 and 7 show an example of protocol stacks in a 3GPP based wireless communication system to which implementations of the present disclosure is applied.

In particular. FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer). Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH): BCCH can be mapped to downlink shared channel (DL-SCH); PCCH can be mapped to paging channel (PCH); CCCH can be mapped to DL-SCH: DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs: reassembly of SDU (AM and UM); duplicate detection (AM only); RLC SDU discard (AM and UM); RLC re-establishment: protocol error detection (AM only).

In the 3GPP NR system, the main services and functions of the PDCP sublayer for the user plane include: sequence numbering; header compression and decompression using robust header compression (ROHC): transfer of user data; reordering and duplicate detection: in-order delivery; PDCP PDU routing (in case of split bearers); retransmission of PDCP SDUs: ciphering, deciphering and integrity protection; PDCP SDU discard: PDCP re-establishment and data recovery for RLC AM; PDCP status reporting for RLC AM: duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer: marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management: establishment, configuration, maintenance and release of signaling radio bearers (SRBs) and data radio bearers (DRBs): mobility functions (including: handover and context transfer, UE cell selection and reselection and control of cell selection and reselection, inter-RAT mobility); QoS management functions: UE measurement reporting and control of the reporting: detection of and recovery from radio link failure; NAS message transfer to/from NAS from/to UE.

Figure 8:
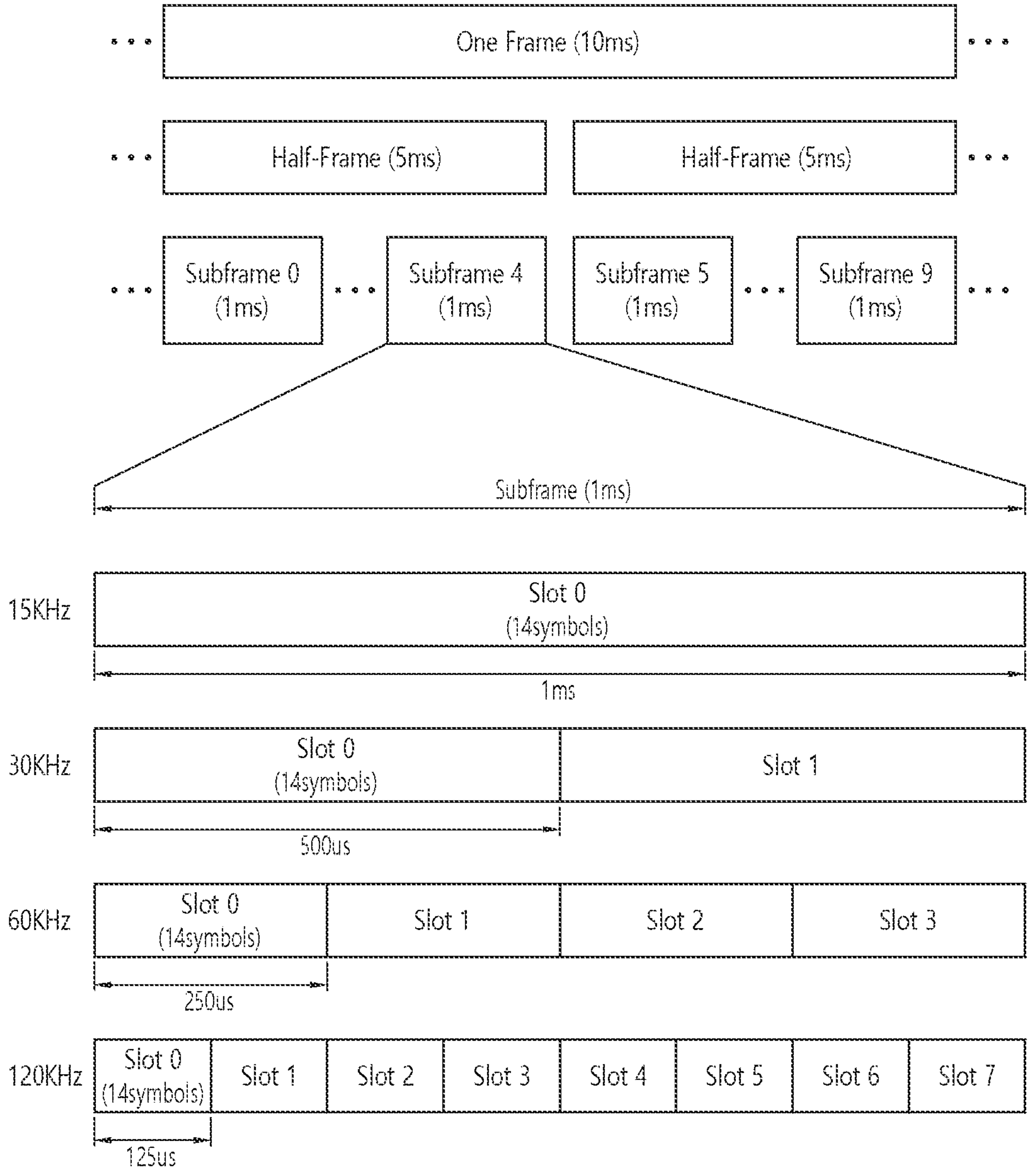
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration T-r per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\beta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\beta f=2^u*15$ kHz.

TABLE 1

| u | $N_{symb}^{slot}$ | $N_{slot}^{frame,u}$ | $N_{slot}^{subframe,u}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\beta f=2^u*15$ kHz.

TABLE 2

| u | $N_{symb}^{slot}$ | $N_{slot}^{frame,u}$ | $N_{slot}^{subframe,u}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{size,u}_{grid,x}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index/representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times. In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
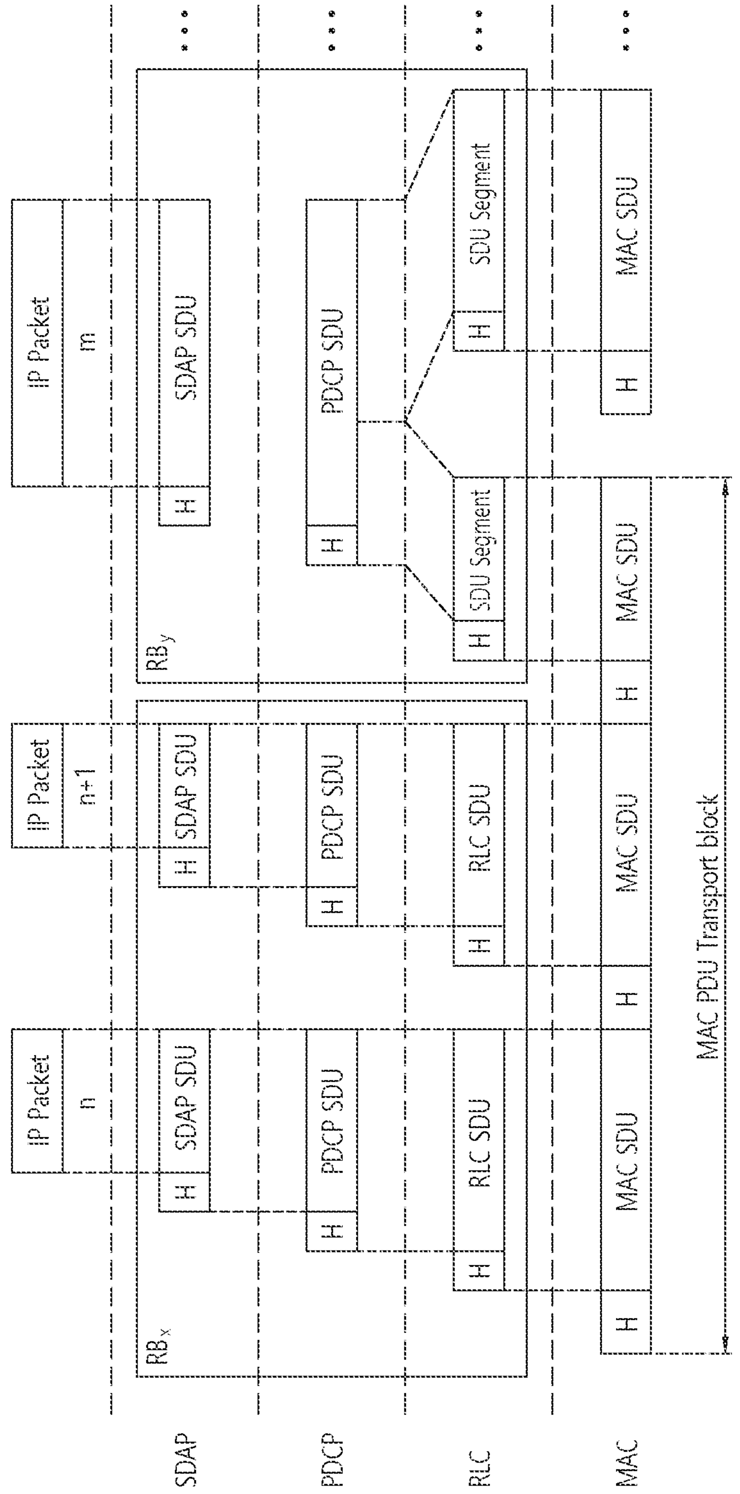
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels physical uplink shared channel (PUSCH) and physical random access channel (PRACH), respectively, and the downlink transport channels DL-SCH, BCH and PCH are mapped to physical downlink shared channel (PDSCH), physical broadcast channel (PBCH) and PDSCH, respectively. In the PHY layer, uplink control information (UCI) is mapped to physical uplink control channel (PUCCH), and downlink control information (DCI) is mapped to physical downlink control channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

Hereinafter, contents regarding a multiple transmit/receive point (multi-TRP or MTRP) are described.

Figure 10:
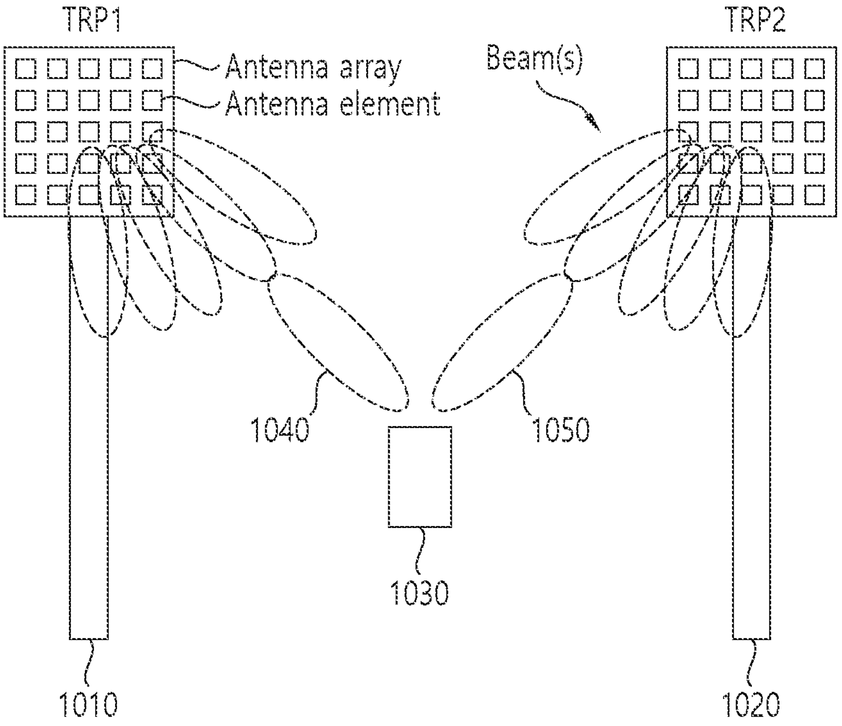
FIG. 10 shows an example of an MTRP based communication according to an embodiment of the present disclosure.

FIG. 10 shows an example of an MTRP based communication according to an embodiment of the present disclosure.

Referring to FIG. 10, UE 1030 is connected to a network via MTRP including TRP1 1010 and TRP2 1020. Each TRP may form a plurality of beams, and communicate with the UE 1030 via one or more of the plurality of beams. For example, TRP1 1010 may communicate with the UE 1030 via a beam 1040 among a plurality of beams formed by the TRP 1 1010, and TRP2 1020 may communicate with the UE 1030 via a beam 1050 among a plurality of beams formed by the TRP2 1020.

A beam may formed by a radiation from a plurality of antenna elements in an antenna array of a TRP. The antenna array and/or at least one antenna element may be related to one or more antenna ports. An antenna port may be defined such that the channel over which a symbol on the antenna port is conveyed can be inferred from the channel over which another symbol on the same antenna port is conveyed. That is, the antenna port is a logical concept, and the channel that is transmitted by a specific antenna port can be done by using a reference signal assigned for the specific antenna port. This means that each antenna port has its own reference signal.

The beam may be represented as a quasi co-location (QCL) information and/or a transmission configuration indication (TCI) state. Two antenna ports are said to be quasi co-located (QCL'ed) if properties of the channel over which a symbol on one antenna port is conveyed can be inferred from the channel over which a symbol on the other antenna port is conveyed. For example, when an antenna port associated with a reference signal and an antenna port on which a symbol is conveyed over a channel are QCL'ed (i.e., the reference signal and the channel are QCL'ed or the channel is QCL'ed with the reference signal), the reference signal and the channel are assumed to be transmitted/received using the same beam. In this case, QCL information for the channel may be the reference signal and/or a beam corresponding to the reference signal, and TCI state of the channel may indicate the QCL information for the channel.

In conclusion, beam/TCI(or TCI state)/QCL(or QCL information) may have the same meaning and may be used interchangeably.

In MTRP operation, a serving cell can schedule the UE from two TRPs, providing better coverage, reliability and/or data rates for PDSCH, PDCCH, PUSCH, and PUCCH.

There are two different operation modes to schedule multi-TRP PDSCH transmissions: single-DCI and multi-DCI. For both modes, control of uplink and downlink operation can be done by physical layer and MAC layer, within the configuration provided by the RRC layer. In single-DCI mode, the UE is scheduled by the same DCI for both TRPs and in multi-DCI mode, the UE is scheduled by independent DCIs from each TRP.

There are two different operation modes for multi-TRP PDCCH: PDCCH repetition and SFN based PDCCH transmission. In both modes, the UE can receive two PDCCH transmissions, one from each TRP, carrying the same DCI. In PDCCH repetition mode, the UE can receive the two PDCCH transmissions carrying the same DCI from two linked search spaces each associated with a different CORESET. In SFN based PDCCH transmission mode, the UE can receive the two PDCCH transmissions carrying the same DCI from a single search space/CORESET using different TCI states.

For multi-TRP PUSCH repetition, according to indications in a single DCI or in a semi-static configured grant provided over RRC, the UE performs PUSCH transmission of the same contents toward two TRPs with corresponding beam directions associated with different spatial relations. For multi-TRP PUCCH repetition, the UE performs PUCCH transmission of the same contents toward two TRPs with corresponding beam directions associated with different spatial relations.

For inter-cell multi-TRP operation, for multi-DCI PDSCH transmission, one or more TCI states can be associated with SSB with a PCI different from the serving cell PCI. The activated TC states can be associated with at most one PCI different from the serving cell PCI at a time.

In some implementations, a UE may perform a radio link monitoring (RLM)/link monitoring (LM) for determining an RLM state (or, radio link state) and/or detecting a beam failure.

For example, the RLM/LM may comprise cell-RLM for determining an RLM state of a cell. The cell-RLM may comprise one or more operations for determining the RLM state of the cell. The one or more operations may comprise determining an RLM state of each of one or more TRPs associated with the cell by performing an RLM on each of the one or more TRPs associated with the cell. The RLM state may comprise at least one of state1, state2 or state3 which will be described later.

For example, the RLM/LM may comprise beam monitoring (BM) for detecting a beam failure. The BM may comprise one or more operations for detecting a beam failure.

The information element (IE) RadioLinkMonitoringConfig (i.e., RLM configuration) may be used to configure the RLM/LM. The UE may perform an RLM based on the RLM configuration to determine an RLM state of cell/TRP. The RadioLinkMonitoringConfig may comprise fields as illustrated in table 5 below:

TABLE 5

```
-- ASN1START
-- TAG-RADIOLINKMONITORINGCONFIG-START
RadioLinkMonitoringConfig ::=          SEQUENCE {
  failureDetectionResourcesToAddModList                          SEQUENCE
(SIZE(1..maxNrofFailureDetectionResources)) OF RadioLinkMonitoringRS
OPTIONAL, -- Need N
  failureDetectionResourcesToReleaseList                         SEQUENCE
(SIZE(1..maxNrofFailureDetectionResources)) OF RadioLinkMonitoringRS-Id
OPTIONAL, -- Need N
  beamFailureInstanceMaxCount                     ENUMERATED {n1, n2, n3,
n4, n5, n6, n8, n10}              OPTIONAL, -- Need R
  beamFailureDetectionTimer                          ENUMERATED {pbfd1,
pbfd2, pbfd3, pbfd4, pbfd5, pbfd6, pbfd8, pbfd10}   OPTIONAL, -- Need R
  ...
}
RadioLinkMonitoringRS ::=              SEQUENCE {
  radioLinkMonitoringRS-Id               RadioLinkMonitoringRS-Id,
  purpose                                        ENUMERATED {beamFailure,
rlf, both},
  detectionResource                      CHOICE {
    ssb-Index                              SSB-Index,
    csi-RS-Index                           NZP-CSI-RS-ResourceId
  },
  ...
}
-- TAG-RADIOLINKMONITORINGCONFIG-STOP
-- ASN1STOP
```

In table 5:—ThebheamFailurefDetectionTimer may be a timer for abeam failure detection.

The beamFailureInstanceMaxCount may determine after how many beam failure events the UE triggers beam failure recovery;

The failureDetectionResourcesToAddMxodList may be a list of reference signals for detecting a beam failure and/or a cell level radio link failure (RLF). The network may configure at most two detectionResources per BWP for the purpose beamFailure or both. If no RSs are provided for the purpose of beam failure detection, the UE may perform beam monitoring based on the activated TCI-State for PDCCH (i.e., beam and/or RS which is activated as being quasi co-located (QCL'ed) with the PDCCH). If no RSs are provided for the purpose of RLF detection, the UE may perform a cell-RLM based on the activated TCI-State of PDCCH (i.e., RS which is activated as being QCL'ed with the PDCCH). The network may ensure that the UE has a suitable set of reference signals for performing cell-RLM;

The RadioLinkMomtoringRS may be referred to as RLM RS (or RS for RLM) in the disclosure.

The detectionResource may indicate a reference signal that the UE shall use for RLF detection or beam failure detection (depending on the indicated purpose). Only periodic 1-port CSI-RS for beam monitoring (BM) can be configured on SCell for beam failure detection purpose; and The purpose may determine whether the UE shall monitor the associated reference signal for the purpose of cell-RLF and/or beam failure detection. For SCell, network may only configure the value to beamFailure.

Further, the IE RLF-TimersAndConstants may be used to configure UE specific timers and constants related to detecting an RLF. The RLF-TimersAndConstants may comprise fields as illustrated in table 6 below:

TABLE 6

```
-- ASN1START
-- TAG-RLF-TIMERSANDCONSTANTS-START
RLF-TimersAndConstants ::=      SEQUENCE {
  t310                                  ENUMERATED {ms0, ms50,
ms100, ms200, ms500, ms1000, ms2000, ms4000, ms6000},
  n310                                  ENUMERATED {n1, n2, n3, n4,
n6, n8, n10, n20},
  n311                                  ENUMERATED {n1, n2, n3, n4,
n5, n6, n8, n10},
  ...,
  [[
  t311                                  ENUMERATED {ms1000,
ms3000, ms5000, ms10000, ms15000, ms20000, ms30000}
  ]]
}
-- TAG-RLF-TIMERSANDCONSTANTS-STOP
-- ASN1STOP
```

Hereinafter, RLF related actions are described. To detect physical layer problems in RRC_CONNECTED, the UE shall:

1> if any DAPS bearer is configured, upon receiving N310 consecutive "out-of-sync" indications for the source SpCell from lower layers while T304 is running:

> start timer T310 for the sourceSpCell.

> upon receiving N310 consecutive "out-of-sync" indications for the SpCell from lower layers while neither T300, T301, T304, T311, T316 nor T319 are running:

2> start timer T310 for the corresponding SpCell.

Upon receiving N311 consecutive "in-sync" indications for the SpCell from lower layers while T310 is running, the UE shall:

1> stop timer T310 for the corresponding SpCell, and determine that the physical layer problems are recovered.

1> stop timer T312 for the corresponding SpCell, if running, and determine that the physical layer problems are recovered.

In this case, the UE maintains the RRC connection without explicit signalling, i.e., the UE maintains the entire radio resource configuration.

Periods in time where neither "in-sync" nor "out-of-sync" is reported by L1 (i.e., physical layer) do not affect the evaluation of the number of consecutive "in-sync" or "out-of-sync" indications.

To detect an RLF, the UE shall:

1> if any DAPS bearer is configured:

2> upon T310 expiry in source SpCell; or

2> upon random access problem indication from source MCG MAC: or

2> upon indication from source MCG RLC that the maximum number of retransmissions has been reached; or 2> upon consistent uplink LBT failure indication from source MCG MAC:

3> consider radio link failure to be detected for the source MCG i.e. source RLF;

3> suspend the transmission of all DRBs in the source MCG:

3> reset MAC for the source MCG:

3> release the source connection.

1> else:

2> upon T310 expiry in PCell; or

2> upon T312 expiry in PCell; or

2> upon random access problem indication from MCG MAC while neither T300, T301, T304, T311 nor T319 are running; or 2> upon indication from MCG RLC that the maximum number of retransmissions has been reached; or 2> if connected as an IAB-node, upon BH RLF indication received on BAP entity from the MCG; or 2> upon consistent uplink LBT failure indication from MCG MAC while T304 is not running:

3> if the indication is from MCG RLC and CA duplication is configured and activated, and for the corresponding logical channel allowedServingCells only includes SCell(s):

4> initiate the failure information procedure to report RLC failure.

3> else:

4> consider radio link failure to be detected for the MCG i.e. RLF;

4> discard any segments of segmented RRC messages:

4> if AS security has not been activated:

4> perform the actions upon going to RRC_IDLE, with release cause 'other';

4> else if AS security has been activated but SRB2 and at least one DRB or, for IAB, SRB2, have not been setup:

5> store the radio link failure information in the VarRLF-Report;

5> perform the actions upon going to RRC_IDLE, with release cause 'RRC connection failure';

4> else;

5> store the radio link failure information in the VarRLF-Report;

5> if T316 is configured; and

5> if SCG transmission is not suspended; and

5> if PSCell change is not ongoing (i.e. timer T304 for the NR PSCell is not running in case of NR-DC or timer T307 of the E-UTRA PSCell is not running in NE-DC):

6> initiate the MCG failure information procedure to report MCG radio link failure.

5> else:

6> initiate performing the connection re-establishment procedure.

The UE may discard the radio link failure information, i.e., release the UE variable VarRLF-Report, 48 hours after the radio link failure is detected.

The UE shall:

1> upon T310 expiry in PSCell; or

1> upon T312 expiry in PSCell; or

1> upon random access problem indication from SCG MAC: or

1> upon indication from SCG RLC that the maximum number of retransmissions has been reached; or 1> if connected as an IAB-node, upon BH RLF indication received on BAP entity from the SCG; or 1> upon consistent uplink LBT failure indication from SCG MAC:

2> if the indication is from SCG RLC and CA duplication is configured and activated; and for the corresponding logical channel allowedServingCells only includes SCell(s):

3> initiate the failure information procedure to report RLC failure.

2> else if MCG transmission is not suspended:

3> consider radio link failure to be detected for the SCG, i.e. SCG RLF;

3> initiate the SCG failure information procedure to report SCG radio link failure.

2> else;

3> if the UE is in NR-DC:

4> initiate performing the connection re-establishment procedure;

3> else (the UE is in (NG)EN-DC):

4> initiate performing the connection re-establishment procedure;

Hereinafter, beam failure detection and recovery procedure are described.

The MAC entity may be configured by RRC per Serving Cell with a beam failure recovery procedure which is used for indicating to the serving gNB of a new SSB or CSI-RS when beam failure is detected on the serving SSB(s)/CSI-RS(s). Beam failure may be detected by counting beam failure instance indications from the lower layers to the MAC entity. If beamFailureRecoveryConfig is reconfigured by upper layers during an ongoing Random Access procedure for beam failure recovery for SpCell, the MAC entity shall stop the ongoing Random Access procedure and initiate a Random Access procedure using the new configuration.

For the beam failure detection procedure, the UE variable BFI_COUNTER (per Serving Cell) may be used. The BFI_COUNTFR may be a counter for beam failure instance indication which is initially set to 0.

The MAC entity shall for each Serving Cell configured for beam failure detection:

1> if beam failure instance indication has been received from lower layers:

2> start or restart the beamFailureDetectionTimer:

2> increment BFI_COUNTER by 1;

2> if BFI_COUNTER>=beamFailureInstanceMaxCount:

3> consider a beam failure to be detected;

3> if the Serving Cell is SCell:

4> trigger a BFR for this Serving Cell;

3> else:

4> initiate a Random Access procedure on the SpCell.

1> if the beamFailureDeteclionTimer expires; or

1> if beamFailureDetectionTimer, beamFailureInstanceMaxCount, or any of the reference signals used for beam failure detection is reconfigured by upper layers associated with this Serving Cell:

2> set BFI_COUNTER to 0.

1> if the Serving Cell is SpCell and the Random Access procedure initiated for SpCell beam failure recovery is successfully completed:

2> set BFI_COUNTER to 0;

2> stop the beamFailureRecoveryTimer, if configured:

2> consider the Beam Failure Recovery procedure successfully completed.

1> else if the Serving Cell is SCell, and a PDCCH addressed to C-RNTI indicating uplink grant for a new transmission is received for the HARQ process used for the transmission of the BFR MAC CE or Truncated BFR MAC CE which contains beam failure recovery information of this Serving Cell; or 1> if the SCell is deactivated:

2> set BFI_COUNTER to 0;

2> consider the Beam Failure Recovery procedure successfully completed and cancel all the triggered BFRs for this Serving Cell.

The MAC entity shall:

1> if the Beam Failure Recovery procedure determines that at least one BFR has been triggered and not cancelled for an SCell for which evaluation of the candidate beams has been completed:

2> if UL-SCH resources are available for anew transmission and if the UL-SCH resources can accommodate the BFR MAC CE plus its subheader as a result of LCP:

3> instruct the Multiplexing and Assembly procedure to generate the BFR MAC CE.

2> else if UL-SCH resources are available for a new transmission and if the UL-SCH resources can accommodate the Truncated BFR MAC CE plus its subheader as a result of LCP:

3> instruct the Multiplexing and Assembly procedure to generate the Truncated BFR MAC CE.

2> else:

3> trigger the SR for SCell beam failure recovery for each SCell for which BFR has been triggered, not cancelled, and for which evaluation of the candidate beams has been completed.

All BFRs triggered for an SCell shall be cancelled when a MAC PDU is transmitted and this PDU includes a BFR MAC CE or Truncated BFR MAC CE which contains beam failure information of that SCell.

Meanwhile, UE may monitor a radio link status of communication link of the UE and evaluate whether the communication link is usable or not. If the UE detects that the communication link is unusable (e.g., in failure) for reasons such as bad radio link quality, repeated transmission failures, and/or security failure, the UE may initiate a recovery procedure such as RRC re-establishment to recover the failure. Since such recovery procedure would typically involve protocol reset/re-establishment/packet discards, causing service interruption, it would be beneficial to avoid such recovery procedure whenever possible.

Currently UE may determine a radio link status/RLM status of a serving cell based on a single set of configured RLM resources. Therefore, if the RLM status based on those resources is determined to be bad, the UE would declare that the serving cell is unusable, even if the UE may keep communicating with the serving cell via other usable TRP or even if the UE may keep communicating with the other cell's TRP.

Therefore, for a UE that is capable of communicating with network by using multiple TRPs associated with a serving cell, in order to minimize triggering of radio link recovery procedures, it would be beneficial if the RLM status of the serving cell would be desirably determined based on the consolidated results of those associated TRPs.

Such consolidated RLM status determination would be useful to reduce the occurrence of RLF of a serving cell, because radio link status of each TRP is typically different/independent and that it is likely that the radio link status of some associated TRP is in a failure condition while other associated TRP is not in failure condition.

In the present disclosure, UE may evaluate RLM state (or, radio link state) of TRPs associated with a serving cell and one or more non-serving cells. Then the UE may initiate a mobility to a non-serving cell/TRP based on the RLM state of those TRPs.

In the procedure disclosure, the term 'mobility' may refer to i) a change of a serving cell, and/or ii) a change of a TRP without changing a serving cell. For example, if the mobility refers to a change of a serving cell from a first cell to a second cell, the mobility may comprise activating/applying a configuration for the second cell, and optionally further comprise deactivating/releasing a configuration for the first cell. For another example, if the mobility refers to a change of a TRP from a first TRP to a second TRP, the mobility may comprise activating/applying a configuration for the second TRP, and optionally further comprise deactivating/releasing a configuration for the first TRP.

In the present disclosure, "serving cell" refers to a cell for % which configuration is activated/applied and is currently used. "Non-serving cell" refers to a cell for which configuration is deactivated/released and is currently unused.

In the present disclosure, "active TRP" refers to a TRP for which configuration is activated/applied and is currently used. "Non-active TRP" refers to a TRP for which configuration is deactivated/released and is currently unused.

FIG. 1I shows an example of a method performed by a UE according to an embodiment of the present disclosure. The method may also be performed by a wireless device.

Figure 11:
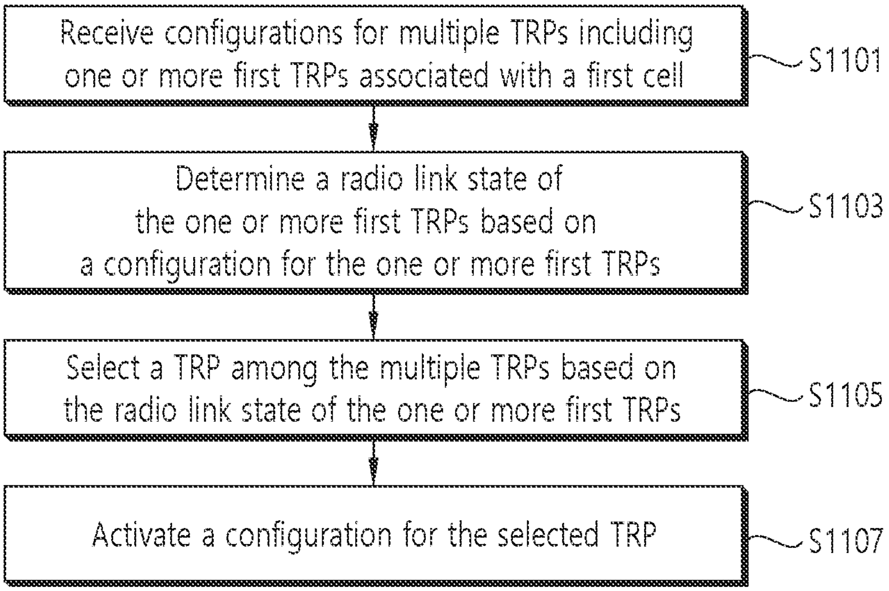
FIG. 11 shows an example of a method performed by a UE according to an embodiment of the present disclosure.

Referring to FIG. 11, in step S1101, the UE may receive configurations for multiple TRPs including one or more first TRPs associated with a first cell.

In step S1103, the UE may determine a radio link state of the one or more first TRPs based on a configuration for the one or more first TRPs.

In step S1105, the UE may select a TRP among the multiple TRPs based on the radio link state of the one or more first TRPs.

In step S1107, the UE may activate a configuration for the selected TRP.

According to various embodiments, the first cell may comprise a serving cell.

According to various embodiments, the multiple TRPs may include one or more second TRPs associated with a second cell that is different from the first cell. The TRP may be selected among the one or more second TRPs.

According to various embodiments, the first cell may comprise a serving cell. The second cell may comprise a non-serving cell, or a serving cell other than the first cell.

According to various embodiments, the UE may determine a radio link state of the first cell based on the radio link state of the one or more first TRPs. The UE may determine a radio link state of the second cell based on a radio link state of the one or more second TRPs. The UE may select the TRP among the one or more second TRPs based on that the radio link state of the first cell is a failure state and the radio link state of the second cell is not a failure state.

According to various embodiments, a radio link state of a cell including at least one of the first cell or the second cell may be determined as a failure state based on that all of TRPs associated with the cell are in a failure state. A radio link state of the cell may be determined as a non-failure state based on that any of the TRPs associated with the cell is not in the failure state.

According to various embodiments, the UE may apply a configuration for the second cell based on activating the configuration for the selected TRP.

According to various embodiments, when applying the configuration for the second cell, the UE may deactivate a configuration for the first cell and the configuration for the one or more first TRPs.

According to various embodiments, the one or more first TRPs may include one or more active TRPs and one or more non-active TRPs. The TRP may be selected among the one or more non-active TRPs.

According to various embodiments, the UE may select the TRP among the one or more non-active TRPs based on that a radio link state of the one or more active TRPs is a failure state and a radio link state of the one or more non-active TRPs is not a failure state.

According to various embodiments, when activating the configuration for the selected TRP, the UE may deactivate a configuration for the one or more active TRPs while keeping a configuration for the first cell activated.

According to various embodiments, the radio link state of the one or more first TRPs may be determined among a plurality of radio link states including a normal state and a failure state. The failure state may be a radio link state in which a failure is detected on the one or more first TRP. The normal state may be a radio link state other than the failure state.

According to various embodiments, the failure may be detected on the one or more first TRPs based on a radio link monitoring (RLM) on the one or more first TRPs. The RLM may comprise monitoring out-of-sync states detected on the one or more first TRPs. Each of the out-of-sync states may be detected based on a radio link quality measured for one or more reference signals (RSs) from the one or more first TRPs being worse than an out-of-sync threshold. A configuration for the one or more RSs may be included in the configuration for the one or more first TRPs.

According to various embodiments, the failure may be detected on the one or more first TRPs based on a number of consecutive out-of-sync states among the out-of-sync states reaching a failure threshold during a period.

According to various embodiments, the failure may be detected on the one or more first TRPs based on that: a number of consecutive out-of-sync states among the out-of-sync states reaches a failure threshold upon which a timer starts; and a number of consecutive in-sync states among in-sync states detected on the one or more first TRPs does not reach a recovery threshold while the timer is running, and the timer expires. Each of the in-sync states may be detected based on a radio link quality measured for the one or more RSs being better than an in-sync threshold.

According to various embodiments, the failure may be detected on the one or more first TRPs based on a quality of the one or more first TRPs being lower than a first threshold. The normal state may be a radio link state in which the quality of the one or more first TRPs is higher than a second threshold. The second threshold may be higher than the first threshold. The quality of the one or more first TRPs may be measured for one or more reference signals (RSs) for which configuration is included in the configuration for the one or more first TRPs.

According to various embodiments, UE may receive a first configuration for a first cell. The first configuration may include a first set of RLM RS for the first cell. The first cell may be a serving cell. The UE may receive and store at least one second configuration for a second cell. The second configuration may include a second set of RLM RS for the second cell. The second cell may be a non-serving cell. The UE may determine a RLM state of the first cell based on the measurements of the first set of RLM RSs. The UE may determine a RLM state of the second cell based on the measurements of the second set of RLM RS. The UE may initiate a handover to the second cell, if the determined RLM state of the first cell is a failure and the determined RLM state of the second cell is not a failure, and apply the second configuration for the second cell.

According to various embodiments, UE may receive and apply a first configuration for a first TRP associated with a serving cell. The first configuration may include a first set of RLM RS for the first TRP. The UE may receive and store a second configuration for a second TRP associated with a serving cell. The second configuration may include a second set of RLM RS for the second TRP. The UE may determine a RLM state of the first TRP based on the measurements of the first set of RLM RS. The UE may determine a RLM state of the second TRP based on the measurements of the second set of RLM RS. The UE may activate the second TRP by applying the second configuration, if the determined RLM state of the first TRP is a failure and the determined RLM state of the second TRP is not a failure, and deactivate the first TRP.

Figure 12:
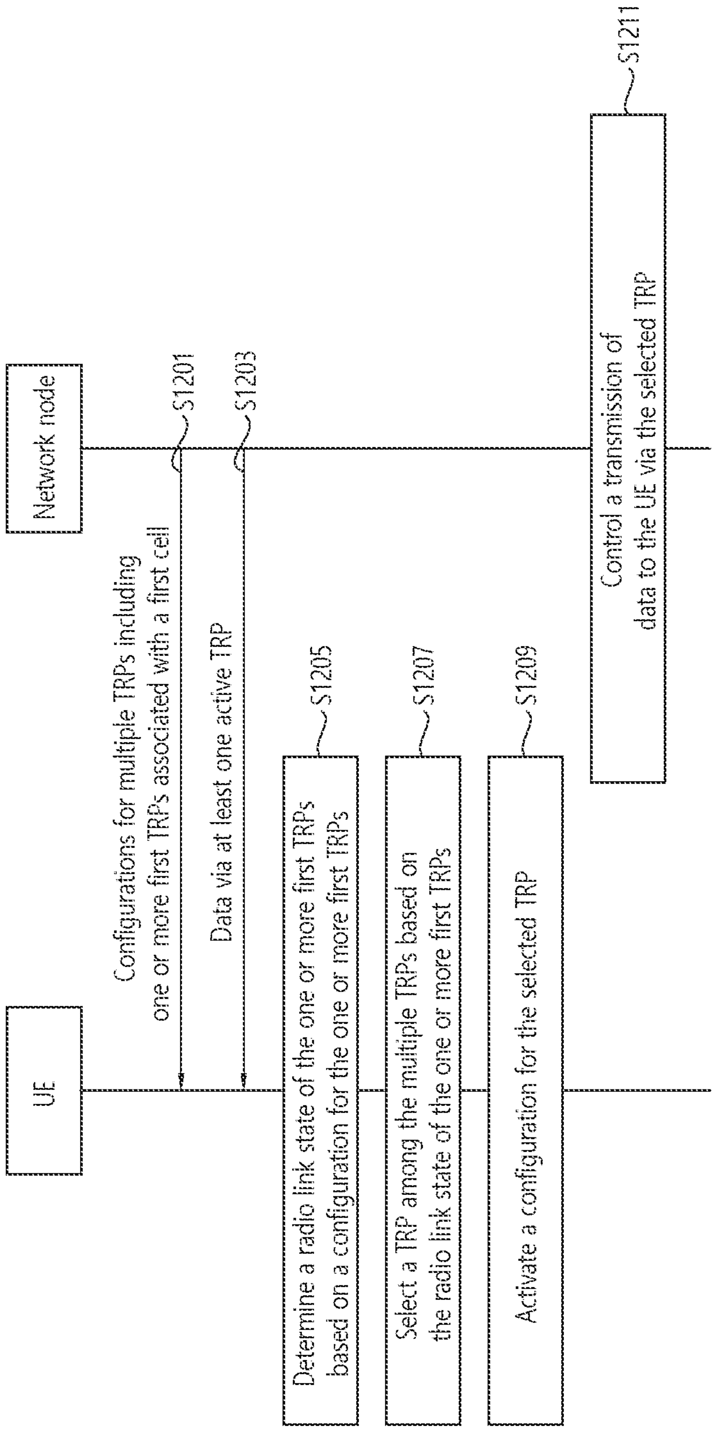
FIG. 12 shows an example of a signal flow for a mobility based on a radio link state of one or more TRPs according to an embodiment of the present disclosure.

FIG. 12 shows an example of a signal flow for a mobility based on a radio link state of one or more TRPs according to an embodiment of the present disclosure. In the signal flow, a network node (e.g., base station (BS)) and a UE may be involved.

Referring to FIG. 12, in step S1201, the network node may transmit, to the UE, configurations for multiple TRPs including one or more first TRPs associated with a first cell. The one or more first TRPs may include at least one active TRP.

In step S1203, the network node may transmit, to the UE, data via the at least one active TRP.

In step S1205, the UE may determine a radio link state of the one or more first TRPs based on a configuration for the one or more first TRPs.

In step S1207, the UE may select a TRP among the multiple TRPs based on the radio link state of the one or more first TRPs.

In step S1209, the UE may activate a configuration for the selected TRP.

In step S1211, the network node may control a transmission of data to the UE via the selected TRP after a configuration for the TRP is activated.

Details of the present disclosure are described below.

Provisioning of Non-Serving Cell/TRP Configuration

For a UE in a serving cell, UE may receive one or more configuration sets for one or more non-serving cells or non-serving TRPs from network (e.g., serving cell). The UE may store the configuration. Until accessing the non-serving cell by performing a mobility to the non-serving cell/serving cell or activating the non-serving TRP by performing a mobility to the non-serving TRP, the UE may not apply the stored configuration, or the UE may partially apply the configuration by only applying an essential configuration for operations that are required for the mobility to the non-serving cell or the activation of the non-serving TRP.

RLM-Related Configuration

In the following, a set of RLM RSs (i.e., a set of RSs for RLM) may be associated with a certain TRP/cee. A set of RLM RSs and a TRP and a cell may be used interchangeably.

In the following, an RLM RS associated with a cell ID may refer to a case that the cell ID is used to generate the RLM RS and/or a case that a pair of a resource configuration for the RLM RS and the cell ID is configured together.

To determine a RLM state (or, radio link state) of a serving cell, UE may be configured with two or more sets of configurations/resources related to RLM state determination. Each RLM configuration/resource including at least RLM RS may be associated with a TRP. Each TRP/RLM RS may be associated with a cell ID, where the cell ID corresponds to the serving cell or a non-serving cell.

The RLM status of each TRP may comprise at least one of state1, state 2 or state3, where:

State1: Normal state,

State2: Problematic state(worse than state1 but better than state3); and

State3: Failure state (or, RLF state).

Here, state1, state2, and state3 may be ordered based on link quality-related metric. State2 may be further divided into several sub-states in the order of the link quality-related metric.

According to an embodiment of the present disclosure, all or a subset of the states defined above can be used. For instance, two states i.e., state1 and state3 can be used to determine the RLM status of a TRP and a serving cell, where state3 corresponds to a radio link failure (RLF) of the associated TRP/cell and state1 corresponds to a normal state (not in RLF) of the associated TRP.

Determination of RLM State of a TRP Based on RLM-RS Measurements

UE may be configured with parameters used to determine RLM state of each TRP based on RLM-RS measurements.

RLM RS of a TRP may be configured such that UE at a given moment can determine whether the TRP is currently in-sync or out-of-sync.

For example, a TRP may be determined to be in state3 if the UE detects consecutive N3 out-of-sync states during T3 duration based on measurements of RLM RS associated with the TRP.

For example, a TRP may be determined to be in state2 if i) the UE detects consecutive N2 out-of-sync states during T2 duration based on measurements of RLM RS associated with the TRP and ii) the TRP is not in state3. Desirably, N3 is assumed to be larger than N2.

For example, a TRP is determined to be in state1 if the TRP is neither in state2 nor in state 3.

RLM RS of a TRP may be configured such that UE at a given moment can determine a quality of the TRP.

For example, a TRP may be determined to be in state3 if the UE detects that the quality of the TRP is lower than a lowest threshold, given that the threshold is configured.

For example, a TRP may be determined to be in state1 if the UE detects that the quality of the TRP is higher than a highest threshold, given that the threshold is configured.

For example, a TRP may be determined to be in state2 if the quality of the TRP is higher than the lowest threshold and below the highest threshold. With proper configuration of thresholds, sub-states of state2 can be also applicable.

Consolidation of RLM States of TRPs for Determination of Serving Cell's RLM State According to some implementations of the present disclosure, a serving cell may be associated with at least two TRPs.

For example, UE may determine that the RLM state of the serving cell is in state1 only if the RLM states of all TRPs associated with the serving cell are in state1.

For example, UE may determine that the RLM state of the serving cell is in state2 if there is at least one TRP for which RLM state is in state 3 of all associated TRPs.

For example, UE may determine that the RLM state of the serving cell is in state2 if there is at least one TRP for which RLM state is not in state1 of all associated TRPs.

For example, UE may determine that the RLM state of the serving cell is in state3 only if the RLM states of all TRPs associated with the serving cell are in state3. UE may determine that the RLM state of the serving cell is not in state 3 if there is at least one TRP for which RLM state is not in state3.

For example, UE may determine that the RLM state of the serving cell is in failure only if the RLM states of all TRPs associated with the serving cell are in failure. UE may determine that the RLM state of the serving cell is not in failure if there is at least one TRP for which RLM state is not in failure.

In case only state1 and state3 are used to determine the state of each TRP and the associated serving cell, the RLM state of the serving cell may be determined to be in state3 only if RLM states of all TRPs associated with the serving cell are in state3.

After UE detects that a TRP is in state3, UE may keep monitoring the RLM state of the TRP and detect that the RLM state of the TRP is out of state3. Such change of RLM state of a TRP may affect the RLM state of the serving cell associated with the TRP. For example, a serving cell associated with two TRPs may be determined to be in state 3 because two TRPs are both in state3. In this case, however, one of the two TRPs is recovered from state3 (i.e., its state is switched from state3 to other state, e.g., state1). This state transition of the TRP may yield to the state transition of the serving cell from state3 to other state, e.g., state 1.

According to some implementations of the present disclosure, a serving cell may be associated with at least two TRPs. At least one TRP may be considered as a primary TRP, and other TRP may be considered as a secondary TRP. Network may explicitly configure which TRP should be considered as a primary TRP and which TRP should be considered as a secondary TRP. Alternatively, the TRP associated with a serving cell ID may be considered as a primary TRP, and the TRP associated with a non-serving cell ID may be considered as a secondary TRP.

For example, UE may determine that the RLM state of the serving cell is in state1 only if the RLM states of all TRPs associated with the serving cell are in state1.

For example, UE may determine that the RLM state of the serving cell is in state2 if there is at least one primary TRP for which RLM state is in state3 of all primary TRPs associated with the serving cell.

For example, UE may determine that the RLM state of the serving cell is in state2 if there is at least one primary TRP for which RLM state is not in state1 of all primary TRPs associated with the serving cell.

For example, UE may determine that the RLM state of the serving cell is in state2 if there is at least one TRP for which RLM state is in state3 of all TRPs associated with the serving cell.

For example, UE may determine that the RLM state of the serving cell is in state2 if there is at least one TRP for which RLM state is not in state1 of all TRPs associated with the serving cell.

For example, UE may determine that the RLM state of the serving cell is in state3 if the RLM states of all primary TRPs are in state3, irrespective of the RLM state of any secondary TRP. In case there is a single primary TRP defined for the serving cell, the UE may consider that the serving cell is in state 3 (e.g. RLF) if RLM state of the primary TRP is in state3.

For example, UE may determine that the RLM state of the serving cell is in failure only if the RLM states of all primary TRPs associated with the serving cell are in failure. UE may determine that the RLM state of the serving cell is not in failure if any of primary TRPs associated with the serving cell is not in failure.

After UE detects that a TRP is in state3, UE may keep monitoring the RLM state of the TRP and detect that the RLM state of the TRP is out of state3. Such change of RLM state of a TRP may affect the RLM state of the serving cell associated with the TRP. For example, a serving cell associated with two TRPs may be determined to be in state 3 because two TRPs are both in state3. In this case, however, one of the two TRPs may be recovered from state3 (i.e., its state is switched from state3 to other state, e.g., state1). This state transition of the TRP may yield to the state transition of the serving cell from state3 to other state, e.g., state 1.

According to some implementations of the present disclosure, UE may be configured with a threshold related to state3 to determine the RLM state of a serving cell.

For example, UE may determine that the RLM state of the serving cell is in state1 only if the RLM states of all TRPs associated with the serving cell are in state1.

For example, if there is at least one TRP associated with the serving cell not in state1 but if the number of TRPs associated with the serving cell not in state1 does not exceed the threshold, the UE may consider that the RLM state of the serving cell is in state2.

For example, if the number of TRPs associated with the serving cell in state3 exceeds the threshold, the UE may consider that the RLM state of the serving cell is in state3. UE may be configured with another threshold related to state2 to determine the RLM state of a serving cell.

After UE detects that a TRP is in state3, UE may keep monitoring the RLM state of the TRP and detect that the RLM state of the TRP is out of state3. Such change of RLM state of a TRP may affect the RLM state of the serving cell associated with the TRP. For example, a serving cell associated with two TRPs may be determined to be in state 3 because two TRPs are both in state3. In this case, however, one of the two TRPs may be recovered from state3 (i.e., its state is switched from state3 to other state, e.g., state1). This state transition of the TRP may yield to the state transition of the serving cell from state3 to other state, e.g., state 1.

Reporting of RLM State of a Serving Cell/TRP

If the RLM state of a TRP associated with the serving cell is not in a state1 while the RLM state of the serving cell is in state1, the UE may report to network information identifying the TRP that is not in state1. For each TRP not in state1 in the report, the state of the TRP may be indicated.

If the RLM state of a TRP associated with the serving cell is in a state1 while the RLM state of the serving cell is in state1, the UE may report to network information identifying the TRP that is in state1.

If the RLM state of a TRP associated with the serving cell is not in a state1 while the RLM state of the serving cell is in state2, the UE may report to network information identifying the TRP that is not in state1. For each TRP not in state1 in the report, the state of the TRP may be indicated.

If the RLM state of a TRP associated with the serving cell is in a state1 while the RLM state of the serving cell is in state2, the UE may report to network information identifying the TRP that is in state1.

If the RLM state of a TRP associated with the serving cell is not in a state1 while the RLM state of the serving cell is in state3, the UE may report to network information identifying the TRP that is not in state1. For each TRP not in state1 in the report, the state of the TRP may be indicated.

If the RLM state of a TRP associated with the serving cell is in a state1 while the RLM state of the serving cell is in state3, the UE may report to network information identifying the TRP that is in state1.

For example, suppose a case that only state 1 and state3 are used, and that UE is configured with a serving cell associated with three TRPs (TRP1 and TRP2 and TRP3). If UE detects that TRP2 is in RLF while TRP1 and TRP3 are not in RLF. UE may report to network hosting the serving cell that TRP2 failure happens. Upon receiving the report of TRP failure in TRP2, network may remove the failed TRP from the associated TRP set for the serving cell, and possibly add a new TRP into the associated TRP set for the serving cell.

If UE detects a change of RLM state of the TRP for which UE sent a report of TRP RLM state (e.g., RLM state of TRP) to network, UE may report the RLM state of the TRP to update the TRP RLM state information. Network may configure UE whether the UE is required to update the TRP RLM state whenever there is a change of the RLM state of the TRP.

Mobility to a Non-Serving Cell or Non-Serving TRP

In the present disclosure, UE may initiate a mobility to a non-serving cell or non-serving TRP based on conditions related to RLM state(s).

According to various embodiments, the term 'mobility' may mean that the UE changes a serving cell and hence applies a new cell configuration according to the change of the serving cell.

According to various embodiments, the term 'mobility' may mean that the UE changes a TRP without changing a serving cell and hence applies a new TRP configuration according to the change of the TRP.

According to some implementations of the present disclosure, several conditions for the mobility can be considered.

For example, if UE detects that RLM state of a serving cell is state3 and that RLM state of a non-serving cell is state1, the UE may initiate a handover to the non-serving cell. Upon initiating the handover, the UE may apply the configuration of the non-serving cell that has been stored.

For example, if UE detects that RLM state of a serving cell is state2 and that RLM state of a non-serving cell is state1, the UE may initiate a handover to the non-serving cell. Upon initiating the handover, the UE may apply the configuration of the non-serving cell that has been stored.

For example, if UE detects that RLM state of an active TRP associated with the serving cell is state3 and that RLM state of an non-active TRP is state1, the UE may activate the TRP in state1 and deactivate the currently active TRP. Upon activating the TRP in state1, the UE may apply the configuration of the newly activated TRP.

For example, if UE detects that RLM state of an active TRP associated with the serving cell is state2 and that RLM state of an non-active TRP is state1, the UE may activate the TRP in state1 and deactivate the currently active TRP. Upon activating the TRP in state1, the UE may apply the configuration of the newly activated TRP.

Figure 13:
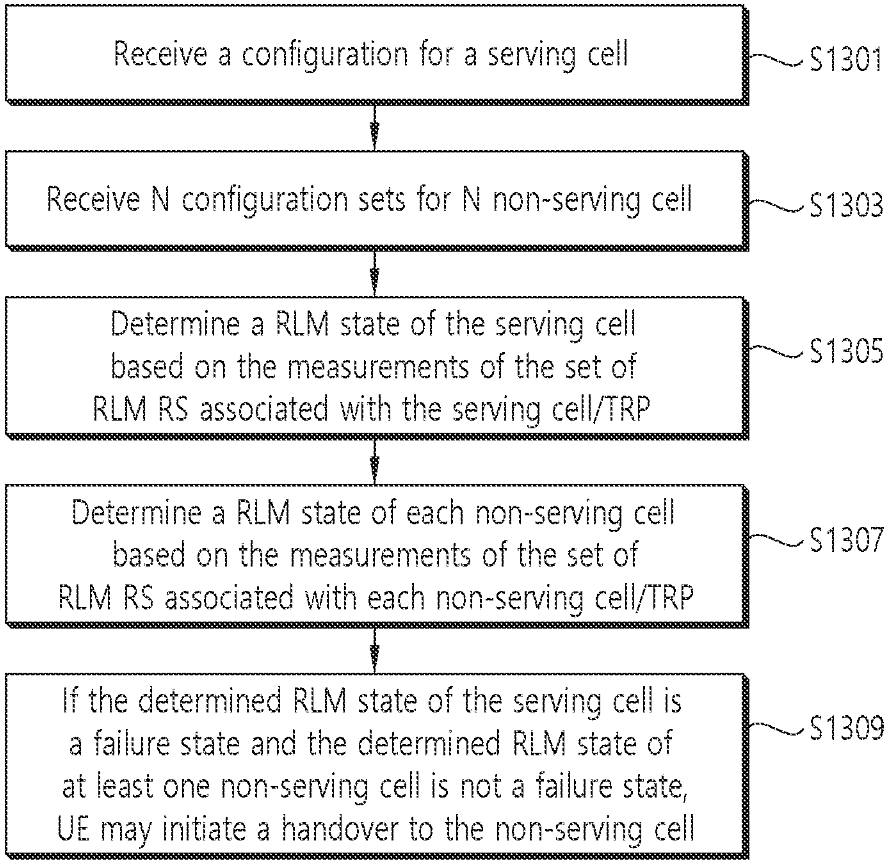
FIG. 13 shows an example of a method for a mobility with a change of a serving cell based on a consolidation of radio link states of one or more TRPs according to an embodiment of the present disclosure.

FIG. 13 shows an example of a method for a mobility with a change of a serving cell based on a consolidation of radio link states of one or more TRPs according to an embodiment of the present disclosure. The method may be performed by a UE and/or a wireless device. In FIG. 13, the RLM state being either a normal state or RLF state is assumed.

Referring to FIG. 13, in step S1301, UE may receive a configuration for a serving cell. The configuration may include a set of RLM RS for the serving cell. The set of RLM RS may be associated with the serving cell/TRP.

In step S1303, the UE may receive N configuration sets for N non-serving cells. Each configuration set may include a set of RLM RS for each non-serving cell. The UE may store the configuration sets. Each set of RLM RS may be associated with each non-serving cell/TRP.

In step S1305, the UE may determine a RLM state of the serving cell based on the measurements of the set of RLM RS associated with the serving cell/TRP.

In step S1307, the UE may determine a RLM state of each non-serving cell based on the measurements of the set of RLM RS associated with each non-serving cell/TRP.

In step S1309, if the determined RLM state of the serving cell is a failure state and the determined RLM state of at least one non-serving cell is not a failure state, UE may initiate a handover to the non-serving cell, and apply the stored target cell configuration.

Figure 14:
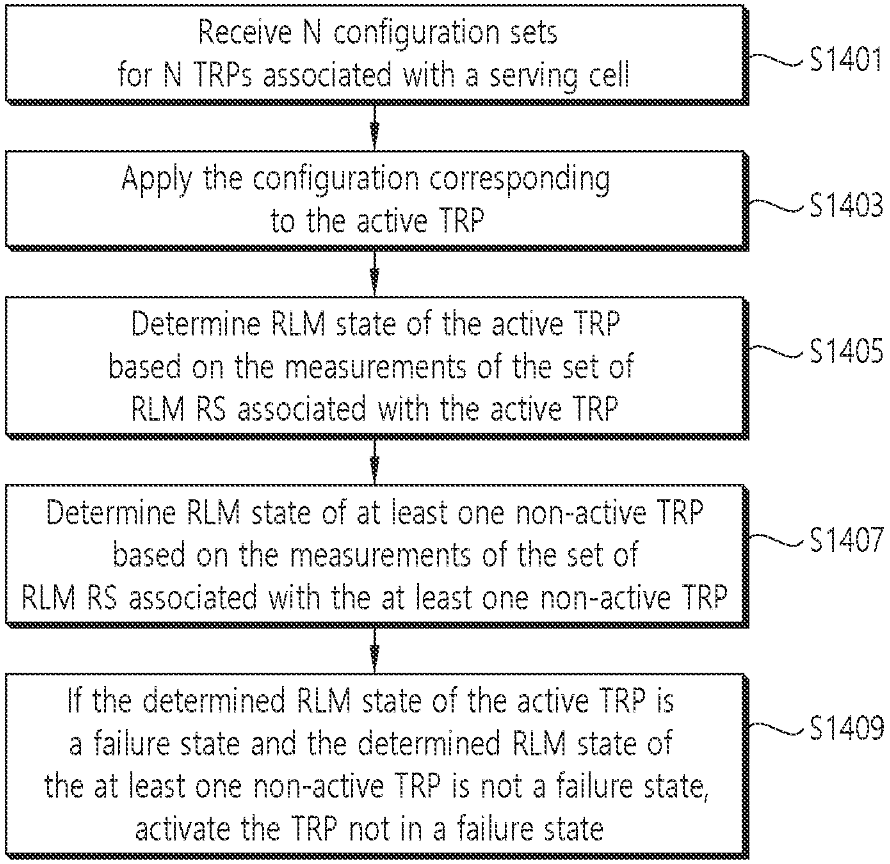
FIG. 14 shows an example of a method for a mobility without a change of a serving cell based on a consolidation of radio link states of one or more TRPs according to an embodiment of the present disclosure.

FIG. 14 shows an example of a method for a mobility without a change of a serving cell based on a consolidation of radio link states of one or more TRPs according to an embodiment of the present disclosure. The method may be performed by a UE and/or a wireless device. In FIG. 14, the RLM state being either a normal state or a RLF state is assumed.

Referring to FIG. 14, in step S1401, UE may receive N configuration sets for N TRPs associated with a serving cell. Each configuration set may include a set of RLM RS and other parameters for each TRP. The UE may store the configuration sets.

In step S1403, UE may be configured to use at least one TRP, which is considered an active/activated TRP. UE may apply the configuration corresponding to the active TRP. The other TRP for which UE stores configurations for the TRP may be considered as a non-active TRP (or, deactivated TRP).

In step S1405, UE may determine a RLM state of the serving cell based on the measurements of the set(s) of RLM RS associated with the TRP(s) associated with the serving cell. The UE may determine RLM state of the active TRP based on the measurements of the set of RLM RS associated with the active TRP In step S1407, UE may determine a RLM state of each non-serving cell based on the measurements of the set of RLM RS associated with each non-serving cell/TRP.

In step S1409, if the determined RLM state of the active TRP is a failure state and the determined RLM state of at least one non-active TRP is not a failure state, UE may activate the TRP not in a failure state and apply the stored configuration for the activated TRP.

Furthermore, the method in perspective of the UE described above in FIG. 11 may be performed by first wireless device 100 shown in FIG. 2, the wireless device 100 shown in FIG. 3, the first wireless device 100 shown in FIG. 4 and/or the UE 100 shown in FIG. 5.

More specifically, the UE comprises at least one transceiver, at least processor, and at least one computer memory operably connectable to the at least one processor and storing instructions that, based on being executed by the at least one processor, perform operations.

The operations comprise; receiving configurations for multiple transmit/receive points (TRPs) including one or more first TRPs associated with a first cell; determining a radio link state of the one or more first TRPs based on a configuration for the one or more first TRPs; selecting a TRP among the multiple TRPs based on the radio link state of the one or more first TRPs; and activating a configuration for the selected TRP.

Furthermore, the method in perspective of the UE described above in FIG. 11 may be performed by a software code 105 stored in the memory 104 included in the first wireless device 100 shown in FIG. 4.

More specifically, at least one computer readable medium (CRM) stores instructions that, based on being executed by at least one processor, perform operations comprising: receiving configurations for multiple transmit/receive points (TRPs) including one or more first TRPs associated with a first cell; determining a radio link state of the one or more first TRPs based on a configuration for the one or more first TRPs: selecting a TRP among the multiple TRPs based on the radio link state of the one or more first TRPs; and activating a configuration for the selected TRP.

Furthermore, the method in perspective of the UE described above in FIG. 11 may be performed by control of the processor 102 included in the first wireless device 100 shown in FIG. 2, by control of the communication unit 110 and/or the control unit 120 included in the wireless device 100 shown in FIG. 3, by control of the processor 102 included in the first wireless device 100 shown in FIG. 4 and/or by control of the processor 102 included in the UE 100 shown in FIG. 5.

More specifically, an apparatus configured to operate in a wireless communication system (e.g., wireless device/UE) comprises at least processor, and at least one computer memory operably connectable to the at least one processor. The at least one processor is configured to perform operations comprising: receiving configurations for multiple transmit/receive points (TRPs) including one or more first TRPs associated with a first cell; determining a radio link state of the one or more first TRPs based on a configuration for the one or more first TRPs; selecting a TRP among the multiple TRPs based on the radio link state of the one or more first TRPs; and activating a configuration for the selected TRP.

Furthermore, the method in perspective of the network node described above may be performed by second wireless device 100 shown in FIG. 2, the device 100 shown in FIG. 3, and/or the second wireless device 200 shown in FIG. 4.

More specifically, the network node comprises at least one transceiver, at least processor, and at least one computer memory operably connectable to the at least one processor and storing instructions that, based on being executed by the at least one processor, perform operations.

The operations comprise: transmitting, to a user equipment (UE), configurations for multiple transmit/receive points (TRPs) including one or more first TRPs associated with a first cell—the one or more first TRPs include at least one active TRP; transmitting, to the UE, data via the at least one active TRP; and controlling a transmission of data to the UE via a TRP after a configuration for the TRP is activated. The TRP may be selected among the multiple TRPs based on a radio link state of the one or more first TRPs. The radio link state of the one or more first TRPs may be determined based on a configuration for the one or more first TRPs.

The present disclosure can have various advantageous effects.

For example, UE can perform a mobility to a non-serving cell or a TRP associated with a serving cell based on a consolidation of radio link states of one or more TRPs associated with the serving cell. Therefore, link stability can be enhanced, and service continuity can be guaranteed.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising:

receiving, by a user equipment (UE), a configuration related to multiple transmit/receive points (TRPs) including comprising one or more first TRPs associated with a first cell, wherein the first cell is a serving cell, and wherein the one or more first TRPs comprises a first TRP and a second TRP;

determining, by the UE, a radio link state of the one or more first TRPs based on a configuration related to the one or more first TRPs;

selecting, by the UE, a TRP among the multiple TRPs based on the radio link state of the one or more first TRPs; and activating, by the UE, a configuration related to the selected TRP, wherein the radio link state of the one or more first TRPs is determined among a plurality of radio link states comprising a normal state and a failure state, wherein the failure state is a radio link state in which a failure is detected on the one or more first TRPs based on a quality of the one or more first TRPs being lower than a first threshold, wherein the normal state is a radio link state in which the quality of the one or more first TRPs is higher than a second threshold, wherein the second threshold is higher than the first threshold, and wherein the quality of the one or more first TRPs is measured on one or more reference signals (RSs) for which a configuration is included in the configuration related to the one or more first TRPs.

2. The method of claim 1, wherein the multiple TRPs include one or more second TRPs associated with a second cell that is different from the first cell, and wherein the TRP is selected among the one or more second TRPs.

3. The method of claim 2, wherein the second cell comprises a non-serving cell, or a serving cell other than the first cell.

4. The method of claim 2, wherein the selecting of the TRP comprises:

determining a radio link state of the first cell based on the radio link state of the one or more first TRPs;

determining a radio link state of the second cell based on a radio link state of the one or more second TRPs; and selecting the TRP among the one or more second TRPs based on that the radio link state of the first cell is the failure state and the radio link state of the second cell is not the failure state.

5. The method of claim 4, wherein a radio link state of a cell including at least one of the first cell or the second cell is determined as the failure state based on that all of TRPs associated with the cell are in the failure state, and wherein a radio link state of the cell is determined as a non-failure state based on that any of the TRPs associated with the cell is not in the failure state.

6. The method of claim 2, further comprising:

applying a configuration related to the second cell based on activating the configuration related to the selected TRP.

7. The method of claim 6, wherein the applying of the configuration related to the second cell comprises:

deactivating a configuration related to the first cell and the configuration related to the one or more first TRPs.

8. The method of claim 1, wherein the one or more first TRPs include one or more active TRPs and one or more non-active TRPs, and wherein the TRP is selected among the one or more non-active TRPs.

9. The method of claim 8, wherein the selecting of the TRP comprises selecting the TRP among the one or more non-active TRPs based on that a radio link state of the one or more active TRPs is the failure state and a radio link state of the one or more non-active TRPs is not the failure state.

10. The method of claim 8, wherein the activating of the configuration related to the selected TRP comprises deactivating a configuration related to the one or more active TRPs while keeping a configuration related to the first cell activated.

11. The method of claim 1, wherein the UE is in communication with at least one of a mobile device, a network, or autonomous vehicles other than the UE.

12. A user equipment (UE) comprising:

at least one transceiver;

at least one processor; and at least one computer memory operably connectable to the at least one processor and storing instructions that, based on being executed by the at least one processor, perform operations comprising:

receiving a configuration related to multiple transmit/receive points (TRPs) comprising one or more first TRPs associated with a first cell, wherein the first cell is a serving cell, and wherein the one or more first TRPs comprises a first TRP and a second TRP;

determining a radio link state of the one or more first TRPs based on a configuration related to the one or more first TRPs;

selecting a TRP among the multiple TRPs based on the radio link state of the one or more first TRPs; and activating a configuration related to the selected TRP, wherein the radio link state of the one or more first TRPs is determined among a plurality of radio link states comprising a normal state and a failure state, wherein the failure state is a radio link state in which a failure is detected on the one or more first TRPs based on a quality of the one or more first TRPs being lower than a first threshold, wherein the normal state is a radio link state in which the quality of the one or more first TRPs is higher than a second threshold, wherein the second threshold is higher than the first threshold, and wherein the quality of the one or more first TRPs is measured on one or more reference signals (RSs) for which a configuration is included in the configuration related to the one or more first TRPs.

* * * * *